United States Patent
Ivanov et al.

(10) Patent No.: US 11,580,131 B2
(45) Date of Patent: Feb. 14, 2023

(54) METHODS AND APPARATUS FOR MONITORING CONFIGURABLE PERFORMANCE INDICATORS

(71) Applicant: Honeywell International Inc., Charlotte, NC (US)

(72) Inventors: Teodor Teodorov Ivanov, Sofia (BG); Tonka Zhivkova Zheleva, Sofia (BG)

(73) Assignee: Honeywell International Inc., Charlotte, NC (US)

( * ) Notice: Subject to any disclaimer, the term of this patent is extended or adjusted under 35 U.S.C. 154(b) by 140 days.

(21) Appl. No.: 17/001,191

(22) Filed: Aug. 24, 2020

(65) Prior Publication Data

US 2021/0064631 A1  Mar. 4, 2021

Related U.S. Application Data

(60) Provisional application No. 62/894,835, filed on Sep. 1, 2019.

(51) Int. Cl.

| | |
|---|---|
| *G06F 16/25* | (2019.01) |
| *G06F 9/451* | (2018.01) |
| *G06F 11/30* | (2006.01) |
| *G06F 11/34* | (2006.01) |
| *G06F 3/04842* | (2022.01) |

(52) U.S. Cl.
CPC ............ *G06F 16/254* (2019.01); *G06F 9/451* (2018.02); *G06F 11/3034* (2013.01); *G06F 11/3409* (2013.01); *G06F 3/04842* (2013.01)

(58) Field of Classification Search
CPC .................................................. G06F 16/254
See application file for complete search history.

(56) References Cited

U.S. PATENT DOCUMENTS

| | | | | |
|---|---|---|---|---|
| 2010/0070421 | A1* | 3/2010 | Fazal | G06Q 10/103 |
| | | | | 705/348 |
| 2015/0046251 | A1* | 2/2015 | Smith | G06F 16/41 |
| | | | | 705/14.41 |
| 2017/0006135 | A1* | 1/2017 | Siebel | G06N 20/00 |
| 2017/0046374 | A1* | 2/2017 | Fletcher | G06F 9/542 |
| 2017/0083572 | A1* | 3/2017 | Tankersley | G06F 11/3006 |
| 2017/0147681 | A1* | 5/2017 | Tankersley | G06Q 10/00 |
| 2018/0024901 | A1* | 1/2018 | Tankersley | G06Q 10/06393 |
| | | | | 707/694 |
| 2018/0218053 | A1* | 8/2018 | Koneru | G06F 3/0482 |
| 2020/0380417 | A1* | 12/2020 | Briancon | G06N 20/20 |
| 2021/0081819 | A1* | 3/2021 | Polleri | G06F 16/252 |
| 2021/0081848 | A1* | 3/2021 | Polleri | G06N 20/20 |

* cited by examiner

*Primary Examiner* — Eliyah S. Harper
(74) *Attorney, Agent, or Firm* — Alston & Bird LLP

(57) ABSTRACT

Apparatuses and methods are provided to generate customizable databases and/or analyze performance. In an example embodiment, a method of generating customizable databases is provided. The method includes receiving a calculation expression relating to one or more defined characteristics. The calculation expression may be defined by a user. The method also includes loading data into a data warehouse. The data includes at least one of the one or more defined characteristics. The method further includes generating a data cube based on the received calculation expression and the data loaded into the data warehouse. The data cube includes an accessible table. A corresponding apparatus is provided. Additional method and apparatus to analyze performance are also provided.

20 Claims, 4 Drawing Sheets

METHODS AND APPARATUS FOR MONITORING CONFIGURABLE PERFORMANCE INDICATORS

CROSS-REFERENCE TO RELATED APPLICATIONS

This application claims the benefit of U.S. Provisional Patent Application No. 62/894,835, filed Sep. 1, 2019, the entire contents of which are incorporated herein by reference.

TECHNOLOGICAL FIELD

An example embodiment relates generally to methods and an associated apparatus for monitoring configurable performance indicators and, more particularly, to methods and an associated apparatus for monitoring configurable performance indicators based on user defined indicators and/or a plurality of target indicators.

BACKGROUND

Various other data analytic platforms lack the flexibility and customizability of the present disclosure. For example, users are restricted to use only system pre-defined metrics. Traditional data analytic platforms do not allow for altering of the computation expression or adding new key performance indicator(s) (KPIs). Through applied effort, ingenuity, and innovation, many identified problems have been solved by developing solutions that are included in embodiments of the present disclosure, many examples of which are described in detail herein.

BRIEF SUMMARY

Methods and apparatuses are provided in accordance with example embodiments in order to generate customizable databases and/or analyze performance. In an example embodiment, a method of analyzing performance is provided. The method includes receiving a request from user for a comparison of two or more computed KPIs. The method also includes accessing the two or more computed KPIs from an accessible table of a data cube. The data cube may be derived from a data warehouse and the two or more computed KPIs each include a defined measured value. The method further includes comparing the defined measured value of the filtered two or more computed KPIs based on the request. The method still further includes providing a signal to a user interface in response to the comparison. The signal may be indicative of the comparison relating to the measured value.

In some embodiments, the method also includes the two or more computed KPIs includes at least two of an actual KPI, a target KPI, or, a potential KPI. In some embodiments, the signal to the user interface is at least one of a numerical and/or graphical representation of the comparison. In some embodiments, the computed KPI includes flight data. In some embodiments, the two or more computed KPIs includes at least one of standard data or user-defined data.

In another example embodiment, an apparatus is provided for analyzing performance. The apparatus includes at least one processor and at least one non-transitory memory including computer program code instructions with the computer program code instructions configured to, when executed, cause the apparatus to receive a request from user for a comparison of two or more computed KPIs. The computer program instructions are also configured to, when executed, cause the apparatus to access the two or more computed KPIs from an accessible table of a data cube. The data cube may be derived from a data warehouse and the two or more computed KPIs may each include a defined measured value. The computer program instructions are further configured to, when executed, cause the apparatus to compare the defined measured value of the filtered two or more computed KPIs based on the request. The computer program instructions are still further configured to, when executed, cause the apparatus to provide a signal to a user interface in response to the comparison. The signal may be indicative of the comparison relating to the measured value.

In some embodiments, the two or more computed KPIs comprises at least two of an actual KPI, a target KPI, or a potential KPI. In some embodiments, the signal to the user interface is at least one of a numerical and/or graphical representation of the comparison. In some embodiments, the computed KPI includes flight data. In some embodiments, the two or more computed KPIs includes at least one of standard data or user-defined data.

In still another example embodiment, a method is provided for generating customizable databases. The method includes receiving a calculation expression relating to one or more defined characteristics. The calculation expression may be defined by a user. The method also includes loading data into a data warehouse. The data includes at least one of the one or more defined characteristics. The method further includes generating a data cube based on the received calculation expression and the data loaded into the data warehouse. The data cube includes an accessible table.

In some embodiments, the defined characteristic includes a user-defined metric. In some embodiments, the data cube includes at least one of the one or more defined characteristics of the data present. In such an embodiment, the at least one of the one or more defined characteristics may be used to group the data within the data cube. In some embodiments, the data includes flight-related data. In some embodiments, the dimensions of the data cube are fixed.

In some embodiments, an apparatus is provided for generating customizable databases. The apparatus includes at least one processor and at least one non-transitory memory including computer program code instructions with the computer program code instructions configured to, when executed, cause the apparatus to receive a calculation expression relating to one or more defined characteristics. The calculation expression may be defined by a user. The computer program instructions are also configured to, when executed, cause the apparatus to load data into a data warehouse. The data includes at least one of the one or more defined characteristics. The computer program instructions are further configured to, when executed, cause the apparatus to generate a data cube based on the received calculation expression and the data loaded into the data warehouse. The data cube includes an accessible table.

In some embodiments, the defined characteristic includes a user-defined metric. In some embodiments, the data cube includes at least one of the one or more defined characteristics of the data present. In such an embodiment, the at least one of the one or more defined characteristics may be used to group the data within the data cube. In some embodiments, the data includes flight-related data. In some embodiments, the dimensions of the data cube are fixed.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
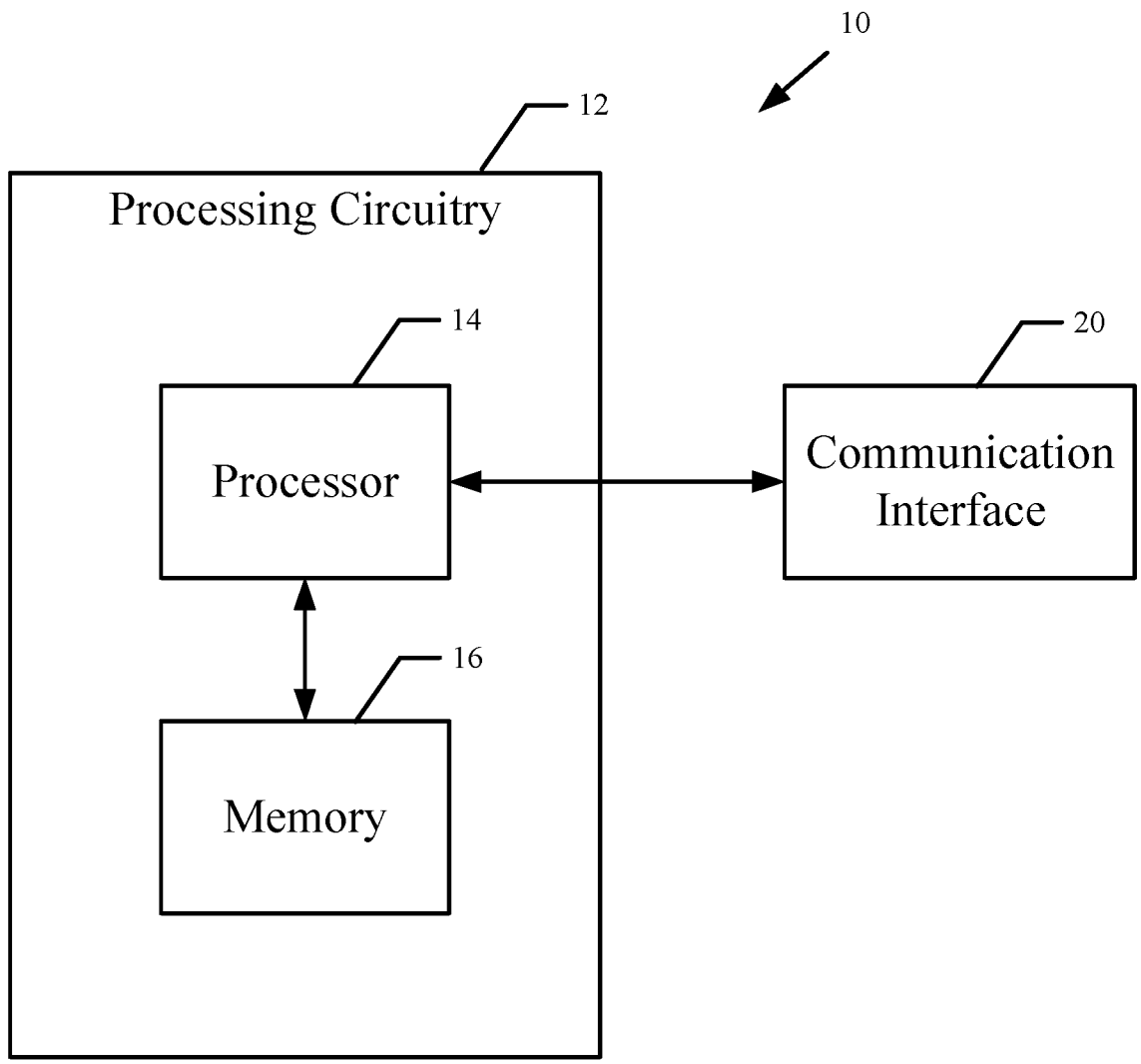
Figure 2:
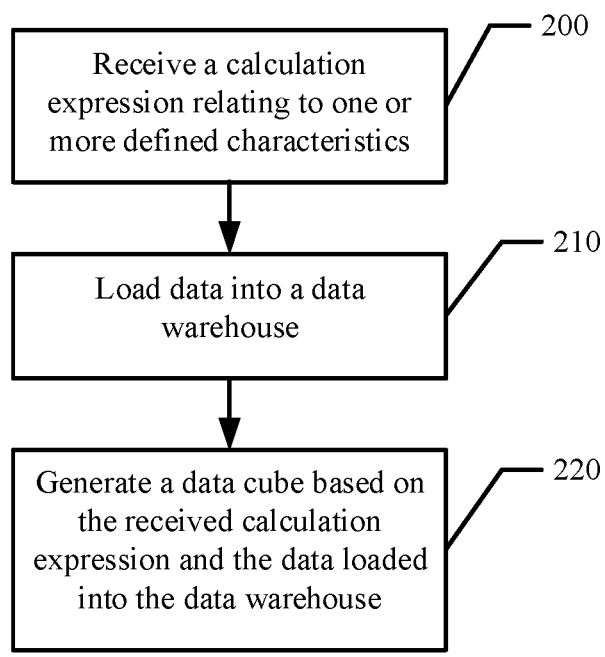
Figure 3:
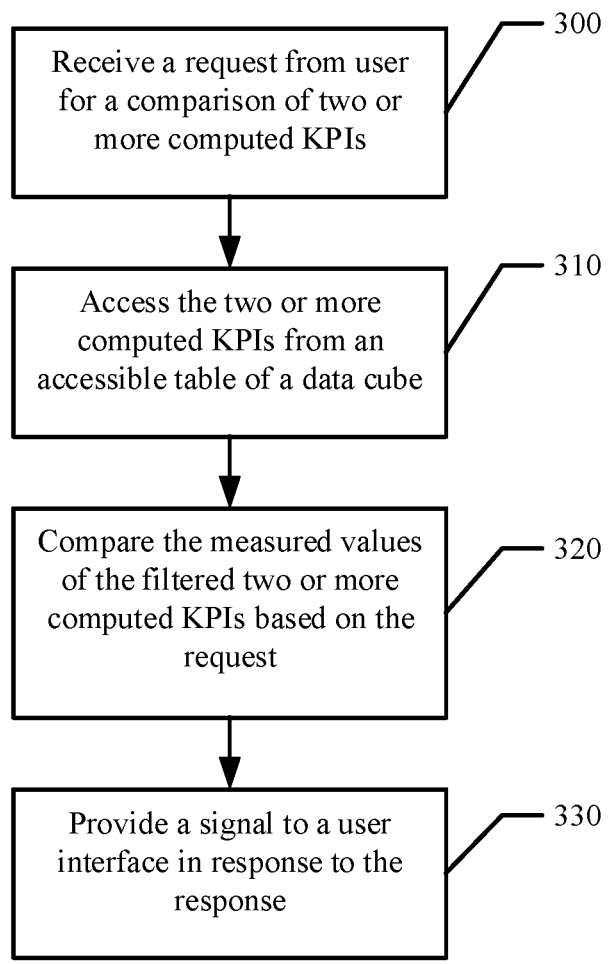
Figure 4:
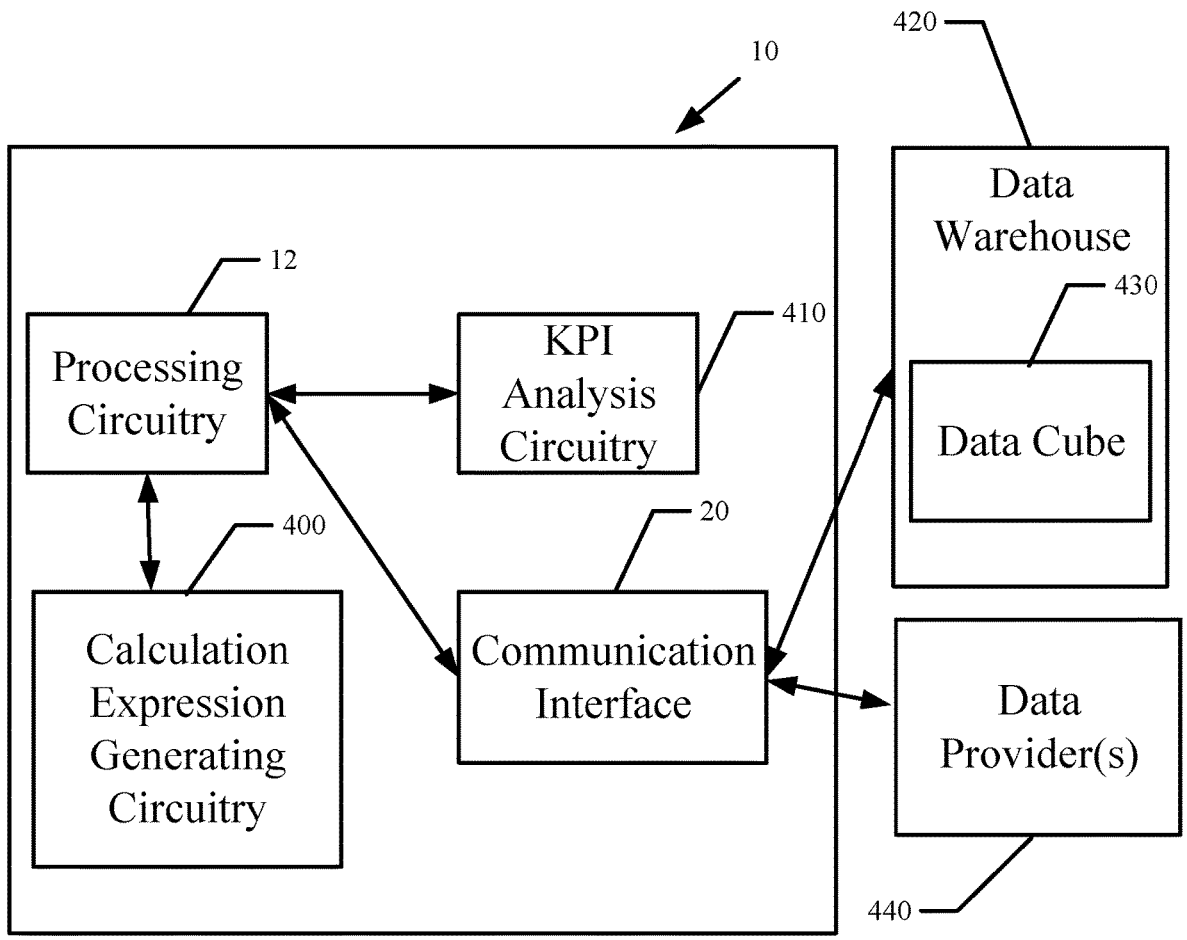

Having thus described certain example embodiments of the present disclosure in general terms, reference will hereinafter be made to the accompanying drawings, which are not necessarily drawn to scale, and wherein:

FIG. 1 is a block diagram of an apparatus configured in accordance with an example embodiment of the present disclosure;

FIG. 2 is a flowchart illustrating the operations performed, such as by the apparatus of FIG. 1, in accordance with an example embodiment of the present disclosure; and FIG. 3 is a flowchart illustrating the operations performed during data processing in accordance with an example embodiment of the present disclosure; and FIG. 4 illustrates a system including an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Various example methods and apparatuses are provided herein in accordance with an example embodiment of the present disclosure for monitoring configurable performance indicators based on user defined indicators and/or a plurality of target indicators. Additionally or alternatively, various example methods and apparatuses are provided herein in accordance with an example embodiment of the present disclosure for analyzing performance and/or generating customizable databases for analyzing performance.

In some examples, the example apparatus may be embodied by a variety of different computing devices. For example, the apparatus may be embodied by one or more servers, personal computers, computer workstations, image processing systems, Application Programmer Interfaces (API) providing access to otherwise stored data or the like.

In one example embodiment, the apparatus is embodied by, associated with or in communication with a data warehouse as described below. Regardless of the type of computing device that embodies the apparatus and/or performs the methods described herein, an apparatus of an example embodiment is depicted in FIG. 1 and includes or is otherwise associated with processing circuitry 12 including, for example, a processor 14 and memory 16, and optionally a communication interface 20 and/or a user interface (not shown) for interacting with the processing circuitry.

In some embodiments of the processing circuitry 12, the processor 14 (and/or co-processors or any other circuitry assisting or otherwise associated with the processor) may be in communication with the memory 16 via a bus for passing information among components of the apparatus 10. The memory 16 may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory 16 therefore serves as a computer-readable storage medium, which refers to a physical storage medium (e.g., volatile or non-volatile memory device), and is differentiated from a computer-readable transmission medium, which refers to an electromagnetic signal. The memory 16 may be configured to store information, data, content, applications, instructions, or the like for enabling the apparatus to carry out various functions in accordance with an example embodiment. For example, the memory 16 could be configured to buffer input data for processing by the processor. Additionally or alternatively, the memory device could be configured to store instructions for execution by the processor.

The processor 14 may be embodied in a number of different ways. For example, the processor 14 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Additionally or alternatively, the processor 14 may include one or more processors configured in tandem via the bus to enable independent execution of instructions, pipelining and/or multithreading.

In an example embodiment, the processor 14 may be configured to execute instructions stored in the memory device 16 or otherwise accessible to the processor. Alternatively or additionally, the processor 14 may be configured to execute hard coded functionality and/or other functionality. As such, whether configured by hardware or software methods, or by a combination thereof, the processor may represent an entity (for example, physically embodied in circuitry) capable of performing operations according to an embodiment while configured accordingly. Thus, for example, when the processor 14 is embodied as an ASIC, FPGA or the like, the processor may be specifically configured hardware for conducting the operations described herein. Alternatively, as another example, when the processor 14 is embodied as an executor of software instructions, the instructions may specifically configure the processor to perform the algorithms and/or operations described herein when the instructions are executed. However, in some cases, the processor 14 may be a processor of a specific device (for example, the computing device) configured to employ an embodiment by further configuration of the processor by instructions for performing the algorithms and/or operations described herein. The processor 14 may include, among other things, a clock, an arithmetic logic unit (ALU) and logic gates configured to support operation of the processor.

The apparatus 10 of an example embodiment may also optionally include a communication interface 20 that may be any means such as a device or circuitry embodied in either hardware or a combination of hardware and software that is configured to receive and/or transmit data from/to other electronic devices in communication with the apparatus, such as by near field communication (NFC) or other proximity-based techniques. Additionally or alternatively, the communication interface may be configured to communicate via cellular or other wireless protocols including Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). Alternatively or additionally, the communication interface may include a wired or wireless connection to one or more other computers, servers, the Internet, or the like.

In some examples, embodiments herein are related to a key performance indicator ("KPI"), which, in some examples, provides the ability for a user, administrator, or the like to define over and /or otherwise ascertain a KPI from a set of data, such as from a vehicle. In some examples, the vehicle may take the form of aircraft and the set of data for the aircraft may include performance data, flight data, fuel data and/or the like. In some examples a KPI may be used as an indicator to track performance, to visualize results, and to set targets. Alternatively or additionally, a KPI may take other forms, such as would be evident to one skilled in the art.

In various embodiments, the definitions for types of computed KPIs below may be used to group and/or classify received data into a data cube. KPIs may be then cached, such as in a KPI caching table, from the data cube, before the KPIs are presented to the user for analysis, review and/or the like.

In some embodiments herein, one or more computed KPIs may be discussed. A computed KPI may be any key performance indictor that is system defined and/or user defined. As such, a computed KPI may categorized as a standard KPI or custom/user-defined KPI. Alternatively or additionally, a computed KPI may be categorized as, but is not limited to one of an actual KPI, a target KPI, a potential KPI, and/or the like. In some examples, a computed KPI may be a combination of KPIs (e.g., actual standard KPI, potential standard KPI, actual user-defined KPI, etc.).

In some examples, an actual KPI may refer to the measured performance of the data that is being monitored. A target KPI may be a predefined objective for the actual KPI. For example, a target KPI may be based on the standard KPI (e.g., a set increase over the standard KPI). A potential KPI may refer to the KPI in an instance the operations being monitored were fully optimized. For example, the potential KPI may be the maximum savings in terms of fuel for a plane during a certain period. Additionally or alternatively, the computed KPI may be categorized as either a standard KPI or user-defined KPI. A standard KPI may refer to a defined as an industry-wide standard or other pre-defined standard value for a given measured value. A user-defined KPI may be any additional KPI that a user defines. For example, the user may define a minimum KPI which indicates the lowest possible acceptable value for a measured value.

In some examples, the term adherence used herein may relate to the comparison of any of the one or more computed KPIs (e.g., the proximity of the actual KPI to a potential KPI). In various embodiments, the adherence may also be treated as a computed KPI for subsequent iterations. For example, the adherence may be stored in the accessible table of the data cube.

In some example embodiments, the computed KPI may be determined or otherwise defined using a calculation expression (e.g., an arithmetic expression that generates a KPI) defined by the user. In some embodiments, the calculation expression may refer to a functional-based expression, defined by integrated query language. Such a calculation expression may specify the requirements for the apparatus 10 to calculate or otherwise solve for the KPI. Such an expression may be carried out by the apparatus 10, such as the processor 14, using an integrated query language that can be executed over data within a data warehouse to generate a data cube having data. In various embodiments, the language of the calculation expression may include basic arithmetic operations and/or a set of integrated functions.

In some embodiments, the integrated query language may include a defined calculation expression that is configured to reference one or more defined characteristics (e.g., vehicle attributes, such as flight attributes) stored in or otherwise extracted from a variety of external data sources, such as a data warehouse. For example, such defined characteristics may be received, via the communication interface 20 discussed herein, from one or more airline information systems that comprise flight data, such as single engine taxi time, flight time, fuel usage, and/or the like. In further example embodiments, the flight data may include attributes, which may include flight planning system, operational system, Quick Access Recorder (QAR) data (e.g., from the flight recorders), and/or the like. In some embodiments, the apparatus 10 may include means, such as the processing circuitry 12, for using integrated query language to access individual flight parameters for all flights, subset of flights, a particular flight, a route, a plane, and/or the like. In some embodiments, the apparatus 10 may include means, such as the processing circuitry 12, for manipulating the data based on requested KPIs.

In various embodiments, KPI may refer to a key performance indicator that may be monitored by an apparatus discussed herein. In some embodiments, the KPI may be a value relating to a defined characteristic discussed herein. In some example embodiments, the KPI may be based upon or otherwise indicative of one or more measurable characteristics, such as a predefined practice, an industry best practice, or the like. For example, an identified metric may be related to an increase company performance, increase fuel usage, decreased carbon footprint, and/or the like. In various embodiments, the apparatus 10 may include means, such as the processing circuitry 12, for monitoring a given measured value over time.

In some embodiments KPI can be defined by a calculation expression, a type, a group, a department, and/or the like. In some embodiments, the calculation expression may specify the requirements for the apparatus 10 to calculate or otherwise solve for a computed KPI. In some examples, "KPI type" (e.g., defined characteristic) may identify a computed KPI and may specify the type of resource to be tracked. For example, fuel, time, currency, distance, user-defined, and/or other resource types may be used during operations. In some embodiments, "KPI group" (e.g., multiple defined characteristics) refers to a category for multiple computed KPIs. For example, a KPI group may be one in which the entire group has one or more similarities. For example, some example KPI groups may include on-time performance, different flight operation initiatives, or the like. In some embodiments, "KPI department" may refer to the specific department for which the computed KPI should be allocated. For example, for an airline, the airline department may include flight ops, dispatch, ground handling, or the like. In various embodiments, the KPI department may be used to create the accessible tables discussed in Block 220 of FIG. 2. In some embodiments, the apparatus 10 may include means, such as the processor 14 to receive KPI flights attributes (e.g. data loaded into data warehouse).

In some embodiments, the measured value from a data set may be an actual KPI. In various embodiments, the actual KPI may be determined, based on a calculation expression, from the accessible table of the data cube discussed in reference to Block 220 of FIG. 2 below. In some embodiments, the measured value of a computed KPI (e.g., actual KPI) may be compared to the one or more computed KPIs, such as, but not limited to, actual KPIs, target KPIs, potential KPIs, and/or the like.

In some examples, the measured value (e.g., actual KPI) may be compared to the potential KPI. In some embodiments, the actual KPI may be compared to the potential KPI to identify whether the measured values are in line, substantially similar to, or otherwise aligned with the best practice or pre-defined standards. Additionally, the apparatus 10 may compare the measured value with additionally metrics, such as target KPI.

In some example embodiments, the "potential" KPI may be a user specified value or a calculated value, such as based on an arithmetic operation, supervised learning, or unsupervised learning, for a measured value that has been fully optimized (e.g., the value of the measured value in an instance all possible savings and/or optimizations are achieved for an individual and/or group of flights). In some example embodiments, the "target" KPI may reflect a realistic improvement over the actual KPI. For example, a target KPI may be a predefined objective based on the potential KPI. In some embodiments, the apparatus 10 may include means, such as the processing circuitry 12, for using a combination of the actual, potential, and/or target KPIs, to model improvement of the measured value (e.g., as discussed in reference to Block 320 of FIG. 3 below).

In some examples, the apparatus 10 may include means, such as the processing circuitry 12 may also rely on an integrated ramp up function to define gradual increase for a computed KPI (e.g., target KPI) over some period of time. For example, the apparatus 10 may model a gradual increase over time (e.g., several months). In some embodiments, the target KPI may be set based on an increase over time along the integrated ramp up function. For example, the target KPI may be a yearly increase in the actual KPI over time. Various example embodiments of the present disclosure allow for customizable KPI functionality that can be fine-tuned for variety of specific use cases (e.g., flight industry).

In some embodiments, the computed KPI may be calculated using filtered data from a data warehouse (e.g., a filtered data set in a data warehouse that is filtered according a predefined criteria). In various embodiments, the computed KPI may be calculated based on filtered data, the resultant of which may be stored in an accessible table of data cube discussed in reference to Block 220 of FIG. 2. For example, an accessible table in a data cube that contains a computed KPI from a set of flights may be used to generate a KPI for that set of flights. In some embodiment, the KPI calculation data (e.g., flight data) may be filtered and stored in an accessible table of a data cube as discussed below in reference to Block 220 of FIG. 2.

In some embodiments, the apparatus 10 includes means, such as the memory 16, for storing the data that is generated or otherwise arranged in a table as a result of the calculation expression. In some embodiments, the data may be represented in a data cube, where the dimensions may be defined by one or more attributes, fixed or configurable, based on the data (e.g., flight data). As discussed below, a data cube may a partitioned portion of the data warehouse, where the partition is based on one or more one or more defined characteristics.

In some embodiments, the dimensions of the data cube may be either fixed or configurable. For example, the one or defined characteristics of a data cube for an airline company may include aircraft type, arrival airport, departure airport, pilot, and/or the like. In some embodiments, each defined characteristic may be defined as an individual entity within the data cube. In some embodiments, the entity may have additional attributes which may serve as additional data cube dimensions. For example, the additional attributes of an airline company may include department, group, and/or the like.

In some embodiments, data processing (discussed in reference to Blocks 210-220 of FIG. 2 below) within the system may include data extraction, validation, and loading of a data set (e.g., set of flight data) to a data cube within a data warehouse. In some embodiments, the apparatus 10 may include means, such as the processing circuitry 12, for performing the operations discussed in reference to FIG. 3.

In some embodiments, the data used in KPI calculation may be determined based on the filtering expression. For example, the filtering expression may be used to filter for the flight data discussed herein. In some embodiments, filtering settings may be adjusted by the user and may reflect different needs for a specific use case (e.g., as discussed in reference to Block 320 of FIG. 3 below). Various embodiments of the present disclosure allow for a flexible approach to data analytics allowed by filtering of the flight entities by analysis. For example, users may use the existing filters, such as outliers, data quality, and/or the like. In some embodiments, the apparatus 10 may use query language as a filtering expression, which may add more customizability.

In some embodiments, the indicator values may allow for built-in analytics functionality. For example, a computed KPI may be defined as an individual entity type within a data cube. In various embodiments, the computed KPI may be a data warehouse entity, which can be subject for data analytics. In some embodiments, the apparatus 10 may allow the user to analyze entities in a data cube within the data warehouse.

In some embodiments, the result from operations discussed in reference to FIG. 2 below may be categorized as a data cube with the dimensions of the cube either fixed or configurable. In some embodiments, the data within a data cube may be further processed (e.g., aggregated) to determine one or more measured values. In some embodiments, the measured values may be stored in a table in the database. In some example embodiments, the apparatus 10 may allow for multiple periods of data import, with one KPI caching table per import period (e.g., an import period may be a year). In some embodiments, the operations of FIG. 2 may be triggered manually when new data is imported or when a calculation expression is changed.

Various embodiments of the present disclosure allow for the ability for additional data exploration and analysis on the computed KPIs (e.g., the values from KPI calculations are data warehouse entities and can be subjects for further data analytics). Various embodiments may have a sophisticated data analytics framework and the possibility to use it over the KPI values gives additional capabilities to the system. For an example it is possible to create a dashboard to track overall progress of the all best practices, used in the airline. At the same time user may perform a drill down, or create another dashboard, to show individual progress of a single best practice. Additionally, various embodiments allow the manipulation of computed KPI (e.g., slicing the data cube for the values in a selected dimension).

By way of example, for a flight, a computed KPI may be a fuel efficiency initiative during operation. In this example, the standard KPI may be the measurement of the effects of either performing or not performing the fuel saving best practice of taxiing with only one running engine for a twin-engine aircraft. The scope of this example fuel efficiency best practice is to taxi with reduced number of active engines as long as possible, if the conditions allow it. The actual KPI results in measuring the achieved savings in terms of fuel. The potential KPI results in measuring the potential savings in terms of fuel, regardless of whether this initiative was performed during that flight or not. In such an example, the target KPI may either be a percentage of the potential KPI or a fixed value of fuel savings. The adherence would be the ratio between actual and potential savings (e.g., the comparison of the actual KPI with potential KPI). In an example, the adherence may be displayed to a user via a user interface. Any other computed KPIs can be applied as well. In an example embodiment, the apparatus 10 may include means for selecting a portion of the actual KPI that includes the desired measure values. For example, only flights with narrow-body aircrafts may be selected. Additional filtering may also be completed, such as for airport, time, pilot, or the like. Upon selection of the actual KPI, the measured values of the data may be compared to one or more computed KPIs (e.g., standard KPI, target KPI, potential KPI, and/or user-defined KPI) to determine the performance of the fuel efficiency.

Referring briefly to FIG. 4, the apparatus 10 of an example embodiment may include, or be in communication with calculation expression generating circuitry 400 and/or KPI analysis circuitry 410. In some embodiments, the calculation expression generating circuitry 400 and/or KPI analysis circuitry 410 may be a part of the processing circuitry 12 shown in FIG. 1. In some embodiments, one or both of the calculation expression generating circuitry 400 and/or KPI analysis circuitry 410 may have a processor that is separate from or otherwise independent of the processor 14 shown in FIG. 1. In some embodiments, the apparatus 10 may also be in communication with a data cube discussed above. In some embodiments, the calculation expression generating circuitry 400 may be configured to carry out the operations discussed in FIG. 2 discussed below. In some embodiments, the KPI analysis circuitry 410 may be configured to carry out the operations discussed in FIG. 3 discussed below.

Additionally or alternatively, in some embodiments, the apparatus 10 may be in communication with a data warehouse 420 containing a data cube 430. In some embodiments, some or all of the data warehouse may be stored in the apparatus 10 (e.g., within the memory 16 of the processing circuitry 12). In various embodiments, the apparatus 10 may be in communication with one or more data providers 440, which provides the data discussed in reference to FIG. 2 below.

Referring now to FIG. 2, the operations performed by the apparatus 10 of an example embodiment of the present disclosure includes means, such as the processing circuitry 12, the processor 14, or the like, for generating customizable databases.

As shown in Block 200 of FIG. 2, the apparatus 10 includes means, such as the processing circuitry 12, the processor 14, the communication interface 20, or the like, for receiving a calculation expression relating to one or more defined characteristics. In some embodiments, the calculation expression may be user-defined or may be pre-defined. In some embodiments, the calculation expression may take the form of arithmetic expression and may define one or more defined characteristics. Such a calculation expression may be carried out by the apparatus 10, such as the processor 14, using an integrated calculation expression language that can be executed over a data warehouse comprising relevant data as discussed in more detail below.

As shown in Block 210 of FIG. 2, the apparatus 10 includes means, such as the processing circuitry 12, the processor 14, the communication interface 20, or the like, for loading data into a data warehouse. In various embodiments, the loading of the data may be based on the calculation expression received (e.g., Block 200 of FIG. 2). In some embodiments, the data includes all relevant received data and is structured such that it includes at least one of the one or more defined characteristics. In some embodiments, the apparatus 10 may include means, such as the processing circuitry 12, for using extract, transform, and load (ETL) functions to load the data into the data warehouse.

Referring now to Block 220 of FIG. 2, the apparatus 10 includes means, such as the processing circuitry 12, the processor 14, or the like, for generating a data cube based on the received calculation expression and the data loaded into the data warehouse. In some embodiments, each data cube may include a portion of the data (e.g., one or more computed KPIs) including at least one of the one or more defined characteristics. In various embodiments, the values of the computed KPIs may be defined as entities and be subject to data analysis. For various embodiments, a data cube may be a partitioned set of data within the data warehouse. In some embodiments, the partition of the data cube may be based on the one or more defined characteristics defined by the calculation expression.

In some embodiments, at least one of the one or more defined characteristic may correspond to an entity within the data cube. For example, each individual actual KPI within the data cube may have information relating to at least one of the defined characteristics. For example, for flight data, a data cube may have a collection of flight data (e.g., actual KPI) that includes fuel usage (e.g., defined characteristic). In some embodiments, the data cube may be searchable and/or manipulated based on a defined characteristic.

In various embodiments, the apparatus 10 includes means, such as the processing circuitry 12, the processor 14, or the like, for creating one or more accessible tables within or otherwise related to the data cube based on the loaded data. In some embodiments, the accessible table may include one or more computed KPIs (e.g., actual KPIs, standard KPIs, potential KPIs, target KPIs, user-defined KPIs, and/or the like). In some embodiments, the computed KPI (e.g., actual KPI) may include at least one of the one or more defined characteristics. In various embodiments, the accessible table may be searchable based on the defined characteristic. In some embodiments, the accessible table may be used as discussed in Block 310 of FIG. 3 below.

Referring now to FIG. 3, the operations performed by the apparatus 10 of an example embodiment of the present invention includes means, such as the processing circuitry 12, the processor 14 or the like, for analyzing performance indicators.

As shown in Block 300 of FIG. 3, the apparatus 10 includes means, such as the processing circuitry 12, the communication interface 20, or the like, for receiving a request from user for a comparison of two or more computed KPIs. In various embodiments, the request may be for a comparison between an actual KPI and at least one other computed KPI (potential KPI, target KPI, and/or the like). In some examples, the comparison is referred to herein as adherence.

Referring now to Block 310 of FIG. 3, the apparatus 10 includes means, such as the processing circuitry 12, the processor 14 or the like, for accessing the two or more computed KPIs from an accessible table of a data cube. In some embodiments the data cube may be derived from the data warehouse discussed herein. In some embodiments, the computed KPI values within the data cube may be entities within the accessible table subject to data analysis. In some embodiments, the apparatus 10 may receive at least a portion of an accessible table discussed in referenced to Block 220 discussed above. In some embodiments, the two or more computed KPIs may be received from a third party. In some embodiments, the two or more computed KPIs may include one or more data points across different times and/or types. In some embodiments, the two or more computed KPIs may be preprocessed by a third party to allow for more efficient processing by the apparatus 10. In various embodiments, the two or more computed KPIs may each comprise a measured value based upon the flight data in the data cube.

As discussed in Block 220 of FIG. 2 above, in various embodiments the data cube may have been filtered such that the two or more computed KPIs each comprise a measured value (e.g., the data loaded into the data warehouse, such as flight data). In some embodiments, the defined measured value may be defined by a user. In some embodiments, the defined measured value may be one or more of the various computed KPIs discussed above. In some embodiments, the apparatus 10 may determine the measured value based on the aggregation of the data within a data cube. In some embodiments, the data within the data cube may include additional information (e.g., additional defined characteristics) that are not related to the desired defined measured value. In some embodiments, the apparatus 10 may select a subset of a given computed KPI of a data cube. For example, a data cube including fuel usage for a set of flights may be further filtered to only include certain plane types.

Referring now to Block 320 of FIG. 3, the apparatus 10 includes means, such as the processing circuitry 12, the processor 14 or the like, for comparing the measured values of the filtered two or more computed KPIs based on the request. In various embodiments, the two or more computed KPIs may be any two of actual KPI, potential KPI, target KPI, and/or the like. In some embodiments, the actual KPI may be defined as the performance of the subject being monitored (e.g., the performance to be analyzed). In various embodiments, the standard KPI may be defined as an industry-wide standard for a given measured value. In some embodiments, the actual KPI may be compared to the potential KPI to determine whether the measured values are in line with the best practice standards. Additionally, for example, the apparatus 10 may compare the measured value of the actual KPI with additionally metrics, such as target KPI, potential KPI, and/or user-defined KPI. In some embodiments, the comparison of the two or more computed KPIs may be stored in the data cube. For example, an adherence value may be determined based on the comparison between the actual KPI and the potential KPI. In some embodiments, the apparatus 10 may include means, such as the processing circuitry 12, for using a combination of the two or more computed KPI (e.g. potential, and/or target KPIs) to model improvement of the measured value of the actual KPI.

Referring now to Block 330 of FIG. 3, the apparatus 10 include means, such as the processing circuitry 12, for providing a signal to a user interface in response to the comparison discussed in Block 320 of FIG. 3. In some embodiments, the signal provided to the user interface may be indicative of the comparison relating to the measured values in response to the request from the user. In some embodiments, the signal may be in the form of a message to the user interface. In some embodiments, the message may be a visual, audible, and/or tactile message to a user. For example, the message may be provided to a user interface, such as a mobile phone or computer screen. In some embodiments, the message may include a numerical comparison and/or a graphical comparison of the two or more computed KPIs (e.g., actual KPI compared to target KPI). In some embodiments, the apparatus 10 may include means, such as the processing circuitry 12, for using a combination of the actual, potential, and/or target KPIs to model improvement of the measured value of the actual KPI.

As described above, FIGS. 2 and 3 illustrate flowcharts of an apparatus 10, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 16 of an apparatus employing an embodiment of the present invention and executed by the processing circuitry 12, the processor 14 or the like of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving a request via one or more inputs to a user interface, the request comprising an indication of two or more computed key performance indicators (KPIs);
   in response to the request, determining a defined measured value for each of the two or more computed KPIs, the defined measured value of at least one of the two or more computed KPIs being determined by an aggregation of data associated with one or more defined characteristics related to the two or more computed KPIs, wherein the data is identified from a complete data set based at least in part on at least one filter criteria associated with the complete data set; and
   providing a signal to the user interface, the signal causing presentation of data at the user interface indicative of a determined adherence of the at least one of the two or more computed KPIs and at least a portion of the data used in the aggregation.

2. The method of claim 1, the two or more computed KPIs comprising an actual KPI and at least one of a target KPI or a potential KPI.

3. The method of claim 1, further comprising:
   determining the adherence of at least one of the two or more computed KPIs based at least on a comparison between the defined measured values of the two or more computed KPIs of the request, the signal to the user interface being provided in response to the determination of the adherence.

4. The method of claim 3, further comprising:
   storing the determined adherence;
   receiving a second request comprising an indication of the determined adherence and at least one computed KPI;
   determining a second adherence based at least on a second comparison of the at least one computed KPI to the determined adherence; and
   providing a second signal to at least one user interface associated with a source of the second request, the second signal causing presentation at the at least one user interface of data indicative of a modeling of change between the second adherence of the at least one computed KPI and the determined adherence.

5. The method of claim 1, further comprising accessing the two or more computed KPIs from a stored data structure generated in accordance with the one or more defined characteristics related to the one or more computed KPIs.

6. The method of claim 5, the data structure being derived from a data warehouse and generated based at least on a user-defined calculation expression, and the one or more defined characteristics being associated with one or more external data sources.

7. The method of claim 1, the two or more computed KPIs being based on at least one of industry-standard data or user-defined data.

8. An apparatus comprising at least one processor and at least one non-transitory memory including computer program code instructions, the computer program code instructions configured to, when executed, cause the apparatus to:
   receive a request via one or more inputs to a user interface, the request comprising an indication of two or more computed key performance indicators (KPIs);
   in response to the request, determine a defined measured value for each of the two or more computed KPIs, the defined measured value of at least one of the two or more computed KPIs being determined by an aggregation of data associated with one or more defined characteristics related to the two or more computed KPIs, wherein the data is identified from a complete data set based at least in part on at least one filter criteria associated with the complete data set; and
   provide a signal to the user interface, the signal causing presentation of data at the user interface indicative of a determined adherence of the at least one of the two or more computed KPIs and at least a portion of the data used in the aggregation.

9. An apparatus comprising at least one processor and at least one non-transitory memory including computer program code instructions, the computer program code instructions configured to, when executed, cause the apparatus to:
   receive, in response to one or more inputs to a user interface, a user-defined calculation expression referencing one or more defined characteristics;
   in accordance with a determination of one or more computed key performance indicators (KPIs) based on data resulting from an execution of the received calculation expression and at least one filter criteria associated with a complete data set, generate a data structure based on the received calculation expression and data associated with at least one of the one or more referenced defined characteristics, the data structure comprising one or more accessible tables comprising the one or more computed KPIs; and
   cause presentation, at the user interface, of a dashboard comprising an indication of the one or more computed KPIs.

10. The method of claim 1, wherein the request is received automatically or in response to user selection of the two or more computed KPIs, the method further comprising:
    identifying the one or more defined characteristics for retrieval based at least in part on the two or more computed KPIs; and
    retrieving the data corresponding to the one or more defined characteristics from at least one data source.

11. The method of claim 10, wherein the two or more computed KPIs are defined based at least in part on a KPI group.

12. The method of claim 10, wherein the two or more computed KPIs are defined based at least in part on a KPI department.

13. The method of claim 1, wherein the determined adherence is a first adherence based at least in part on an actual KPI and a potential KPI, and the method further comprising:
determining a second adherence based at least in part on the actual KPI and a target KPI,
wherein the user interface further includes the first adherence and the second adherence.

14. The method of claim 1, wherein at least a potential KPI of the two or more computed KPIs is generated from the aggregation of the data utilizing at least one supervised or unsupervised learning model.

15. The method of claim 1, wherein the two or more computed KPIs comprises a target KPI, the method further comprising:
generating the target KPI based at least in part on a combination of one or more other actual, potential, and/or target KPIs to model improvement of the defined measured value.

16. The method of claim 1, the method further comprising:
applying a ramp up function to at least one of the two or more computed KPIs to generate an updated KPI, wherein the user interface comprises at least the updated KPI.

17. The method of claim 1, wherein the defined measured value for each of the two or more computed KPIs are arranged in a data cube.

18. The method of claim 17, wherein the data cube is associated with dimensions defined based at least in part on each defined measure value in the data cube.

19. The method of claim 1, the method further comprising:
generating a separate KPI caching table for each import period of a plurality of import periods, wherein the aggregation of data comprises an aggregation of a plurality of separate KPI caching tables for the plurality of import periods.

20. The method of claim 1, wherein the user interface is configured to enable manipulation of the two or more computed KPIs by slicing a data cube associated with the two or more computed KPIs in a selected dimension.

* * * * *